United States Patent
Pamart et al.

(10) Patent No.: US 8,121,131 B2
(45) Date of Patent: Feb. 21, 2012

(54) TRANSMISSION OF A TRIBUTARY IN SYNCHRONOUS MODE AT THE LEVEL OF A LINK OF A DATA NETWORK

(75) Inventors: Jean-Luc Pamart, Pleumeur-Bodou (FR); François-Xavier Ollivier, Lannion (FR)

(73) Assignee: Ekinops, Lannion (FR)

( * ) Notice: Subject to any disclaimer, the term of this patent is extended or adjusted under 35 U.S.C. 154(b) by 84 days.

(21) Appl. No.: 12/442,811

(22) PCT Filed: Oct. 3, 2007

(86) PCT No.: PCT/FR2007/001616
§ 371 (c)(1),
(2), (4) Date: Jun. 17, 2009

(87) PCT Pub. No.: WO2008/040881
PCT Pub. Date: Apr. 10, 2008

(65) Prior Publication Data
US 2010/0046551 A1 Feb. 25, 2010

(30) Foreign Application Priority Data
Oct. 3, 2006 (FR) ...................... 06 08662

(51) Int. Cl.
*H04L 12/56* (2006.01)
(52) U.S. Cl. ................ 370/395.6; 370/389; 370/395.51; 370/466

(58) Field of Classification Search ............. 370/529
See application file for complete search history.

(56) References Cited

U.S. PATENT DOCUMENTS
2002/0186724 A1 12/2002 Bayer et al.
2004/0218626 A1* 11/2004 Tyldesley et al. ............ 370/464

FOREIGN PATENT DOCUMENTS
DE 195 18 205 C1 9/1996
EP 1 043 856 A 10/2000
EP 1043856 A2 * 10/2000
EP 1 246 383 A 10/2002

* cited by examiner

*Primary Examiner* — Jason Mattis
*Assistant Examiner* — James P Duffy
(74) *Attorney, Agent, or Firm* — Harness, Dickey & Pierce, P.L.C.

(57) ABSTRACT

A method of transmitting a tributary in synchronous mode at the level of a link of a data network is disclosed. The tributary comprising at least one frame including at least one payload envelope area and one transport overhead area. The envelope area includes at least one payload and load supervision data related thereto. The transport overhead area includes transport supervision data related and an area of fixed patterns. The method comprises modifying a frame to create a modified frame and transmitting the modified frame. Modifying the frame comprises: part of the fixed patterns are deleted from the fixed pattern area; the positions of the part of the fixed patterns deleted are recorded; replacement data are inserted at the level of the positions. The method is characterized in that the replacement data comprise the transport supervision data of the frame of the tributary.

14 Claims, 5 Drawing Sheets

TRANSMISSION OF A TRIBUTARY IN SYNCHRONOUS MODE AT THE LEVEL OF A LINK OF A DATA NETWORK

CROSS-REFERENCE TO RELATED APPLICATIONS

This application is a National Phase Entry of International Application No. PCT/FR2007/001616, filed Oct. 3, 2007, which claims priority to French Patent Application No. 06/08662, filed Oct. 3, 2006, both of which are incorporated herein by reference.

BACKGROUND AND SUMMARY

The present invention relates to a method for transmitting a tributary in synchronous mode at the level of a link of a data network.

Tributaries correspond to a data flow received or emitted by some equipment at the level of a link in a data network. The transmission of a tributary in synchronous mode may concern a time division multiplexing which consists in grouping several asynchronous tributaries having a first rate on a single container having a higher rate so as to make common a transmission carrier. The transmission of a tributary in synchronous mode may also relate to a time division inverse multiplexing which consists in fragmenting a tributary onto several channels with lower rates which will be subsequently realigned to reconstitute the original tributary. This technique makes it possible to facilitate the transport of high rate signals on channels where the propagation frequency is limiting. The transmission of a tributary in synchronous mode also relates to the regeneration of a tributary which consists in transmitting a tributary at the same rate.

Synchronous flows are either flows of the SDH "Synchronous Digital Hierarchy" type or flows of the SONET "Synchronous Optical Network" type. Whereas the SONET concept was developed in the United States, the SDH hierarchy is, in particular, the subject of UIT-T (Union Internationale des Télécommunications=International Telecommunication Union) recommendation G.707. The following part of the present description will deal with the SDH hierarchy but as the SONET and SDH concepts are close to each other, it is within the range of the persons skilled in the art to extrapolate what will be said about the SDH hierarchy to the SONET concept. The advantage of the synchronous transfer mode, as it is indicated in the SDH hierarchy and in the SONET concept, lies in the structure of the used frames which is similar throughout the hierarchy and which allows the aggregation of different flows by interlacing after an adaptation of the rate using a mobile pointer making it possible to identify the beginning of the payload in each transport container. For further details about the SDH hierarchy or the SONET concept, please also refer to the above mentioned recommendation G707.

The SDH or SONET standards more particularly teach a method for transmitting at least one tributary in synchronous mode at the level of a link of a data network, said tributary comprising at least one frame in the SDH or SONET format, said frame comprising at least one payload envelope area and one transport overhead area, said payload envelope area comprising at least one payload and load supervision data related to the payload, said transport overhead area comprising at least transport supervision data related to transport and an area and fixed patterns (A1, A2) allowing the alignment of said frame in reception, said method including steps of:
modifying said frame so as to generate a modified frame;
transmitting said modified frame.

During a link in the form of a multiplexing using a multiplexer in the SDH or SONET standard, the supervision data comprised in the field of the transport overhead of each tributary are processed then deleted and then replaced by new supervision data corresponding to a higher level signal in the hierarchy. This requires an adjustment of the rate of the tributary trains by modifying the pointer and the position of the beginning of the payload in the frame. During the multiplexing operation, the modification of the pointers of each of the tributaries has an impact on the contents of the train and the position of the payload in the transport container, so as to adjust the rate of the tributaries to the local rate of the multiplexer.

Thus, the multiplexing method previously described has the disadvantage that the tributaries are not really transmitted with a fixed rate and contents. This more particularly prevents a transparent transmission of the tributaries in the network and affects the needed integrity of the signal transmitted mentioned by some users. The aim of the invention is more particularly to remedy this drawback.

To keep a content tributary strictly identical during the transmission, the tributary itself could be considered as a payload and an overhead could be applied thereto, thus enabling the insertion of supervision data. However, the overhead would make the obtained frame non compatible with the SDH or SONET standards and would thus make it impossible to use the invention on existing networks.

Thus, the aim of the invention is to allow a transparent transmission of a tributary in synchronous mode at the level of a link of the data network. Another aim of the invention is also to provide equal frequencies at the input and the output of a link of a data network. Another aim of the invention is to allow a transparent transmission of a tributary in synchronous mode at the level of a link of a data network while keeping compatibility with the SDH or SONET standards.

The document EP 1246383 A1 is known in the state of the art. This document describes a system of transmission by data multiplexing in the form of SDH or SONET frames. For the purpose of the multiplexing and the adaptation of the transmission rate after multiplexing, a sequence of fixed patterns of frame is replaced by another sequence of adaptation having a variable size, with the sequence including controlled and management data. However, in the above-mentioned document, the coherence of the tributary flow in reception after the inverse multiplexing is not kept. The invention also aims at remedying this drawback.

Therefore, the invention relates to method of transmitting at least one tributary in synchronous mode at the level of the link of the data network, said tributary comprising at least one frame in the SDH or SONET format, said frame comprising at least one payload envelope area and one transport overhead area, said payload envelope area comprising at least one payload and load supervision data relating to the payload, said transport overhead area comprising at least transport supervision data related to transport and an area of fixed patterns comprising fixed patterns, said method comprising steps of:
modifying said frame so as to generate a modified frame;
transmitting said modified frame, the modification comprising the steps in which:
part of said fixed patterns are deleted from said fixed pattern area;
the positions of said part on the fixed patterns deleted are recorded;
replacement data are inserted at the level of said positions, wherein said replacement data includes transport supervision data of the frame of said tributary.

Thus, by deleting a part of the fixed patterns, space is cleared to insert replacement data. This replacement then makes it possible to keep fixed the rate at the level of the link. In addition, in the case of the inverse multiplexing, thanks to the fact that the replacement data include the transport supervision data of the frame of said tributary, the coherence of the tributary flow in reception after an inverse multiplexing is kept. On the contrary, the document EP 1246383 A1 mentioned above does not relate to the inverse multiplexing and does not make it possible to keep the coherence of the tributary flow in reception after an inverse multiplexing.

The deleted part of the fixed patterns exactly corresponds to a quantity required for the insertion of the replacement data, so that the rate of tributaries is strictly fixed when going through the link. The replacement data are then adapted as a function of the type of the transmission of the tributary. The invention thus processes advantageously the fixed patterns of an SDH or SONET frame by adding replacement data to a fixed pattern field. The invention can be applied to any type of transmission at the level of a link and more particularly to a time division multiplexing, a time division inverse multiplexing or a signal regeneration.

According to one embodiment of the invention, in said method said replacement data include said supervision data and said method includes steps in which:
said supervision data are stored;
after the storing step, said supervision data are replaced by new supervision data.

In this case, the replacement data correspond to the supervision data themselves. This makes it possible to remain compatible with the SDH standard in spite of the introduction of new supervision data. This embodiment is advantageously implemented in the case of an inverse multiplexing.

The deletion of fixed patterns in the area of fixed patterns also has the advantage of clearing some space for proprietary data related for example to services while complying with the rate constraints. For the purpose of the present invention, external data are thus defined as data not included in the process frame. Such external data are distinguished for example from supervision data which are included in the frame. In this case, in the method of the invention, said replacement data include external data.

In order to be adapted to the SDH format in the above mentioned method, said tributary comprising at least one frame in the SDH format and said fixed patterns are alignment words. According to this embodiment, alignment words are deleted. The replacement data thus replace these deleted alignment words.

In addition, said transmission includes an emission and a reception wherein upon the reception, fixed words are reinserted at the level of said positions. This makes it possible then upon the reception to obtain a tributary exactly similar to the transmitted tributary. The coherence is thus guaranteed according to the method of the invention. In this case, upon the reception, it is possible to reintroduce said replacement data into the transport supervision data area.

According to one embodiment, the method includes a step of introducing a delay, said replacement data being inserted after said introduced delay. The invention also relates to a device for the transmission of at least one tributary in synchronous mode at the level of a link of a data network, said tributary comprising at least one frame in the SDH or SONET format, said frame comprising at least one payload envelope area and one transport overhead area, said payload envelope area comprising at least one payload and load supervision data linked to the payload, said transport overhead area comprising at least transport supervision data related to the transport and an area of fixed patterns comprising fixed patterns, said method including:
means for modifying said frame so as to generate a modified frame;
means for transmitting said modified frame,
means for deleting a part of said fixed patterns in said fixed patterns area;
means for recording the position of said part of said deleted fixed patterns;
means for inserting replacement data at the level of said positions,
wherein said modification means are so arranged that said replacement data include said transport supervision data of the frame of said tributary.

According to a second aspect, the invention relates to a point to point transmission of data, wherein it is not necessary to guarantee the compatibility with SDH or SONET technology transport elements. Thus, according to this aspect, the tributaries are not necessarily compatible with these formats. As a matter of fact, in this case, maintaining the SDH frequency makes it possible in itself to use current SDH equipment which are not expensive.

Thus, according to this second aspect, the invention relates to a method for transmitting at least one tributary in synchronous mode at the level of a link of a data network, said tributary including at least one frame, one frame including at least one payload envelope area and one transport overhead area, said payload envelope area comprising at least a payload and load supervision data related to the payload, said transport overhead area comprising at least transport supervision data related to the transport and an area of fixed patterns including fixed patterns, said method comprising steps of:
modifying said frame so as to generate a modified frame;
transmitting said modified frame,
the modification comprising at least one step in which:
a part of said fixed patterns are deleted from said fixed patterns area, so as to reduce the rate of the tributary.

Thus, according to this aspect of the invention, the fixed patterns are used themselves as information for the adjustment of the rate when passing through a transmission device more particularly for the multiplexing or regeneration. As a matter of fact, according to this aspect of the invention, the deletion of a part of the fixed patterns makes it possible to adapt the rate of the tributary to the transmission device during the multiplexing or the regeneration. According to this aspect of the invention, the fixed patterns are deleted without being replaced by other data, so that the result is a reduction in the rate.

On the contrary, in the document EP 1246383 A1 mentioned above, in the case of a multiplexing, fixed patterns are deleted, but they are replaced by patterns having the same length at locations temporarily used for other purposes. The result is thus a constant rate which does not make it possible to adapt to the rate of the multiplex transmission device. In addition, in the above mentioned document, the compatibility with the SDH format is an essential aspect, whereas the pure deletion of the invention without any replacement does not make it possible to maintain this compatibility.

BRIEF DESCRIPTION OF DRAWINGS

Now, one embodiment of the invention will be described while referring to the appended figures in which.

DETAILED DESCRIPTION

Figure 1:
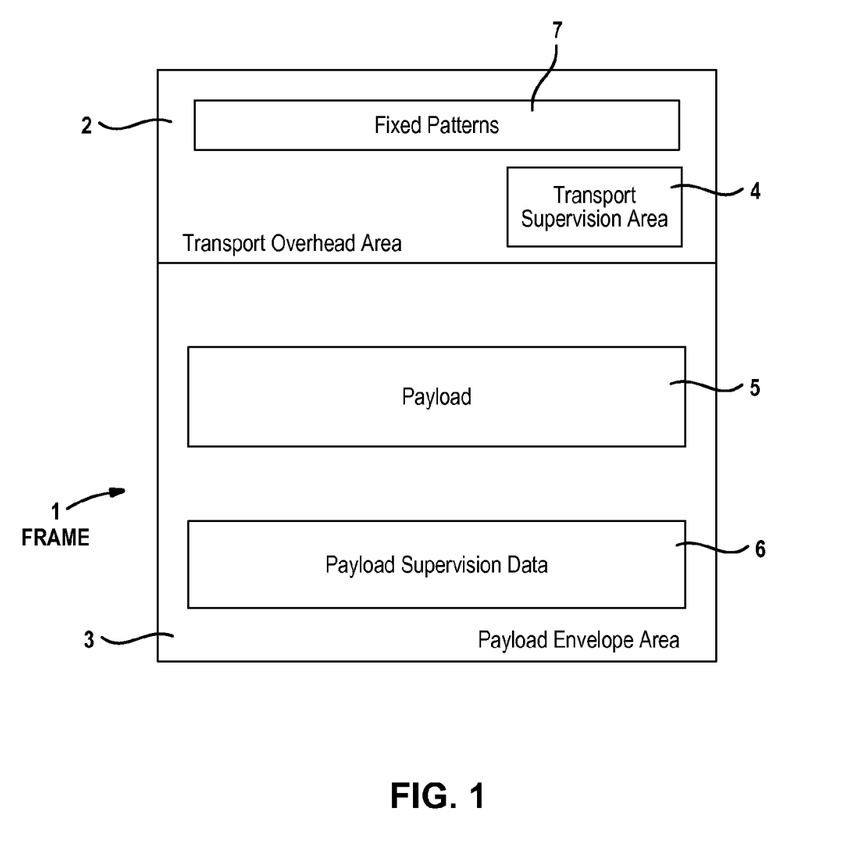
FIG. 1 shows a frame in the SONET format.

In FIG. 1, a frame 1 in the SONET format is illustrated, which includes a payload envelope area 3 and a transport overhead area 2. The payload envelope area 3 includes the payload 5 and payload supervision data 6 related to the payload 5 of the frame 1. The transport overhead area 2 includes transport supervision data 4 related to the transport of the frame 1 and fixed patterns 7 making it possible to align the frame 1 upon the reception. In a way known per se, the fixed patterns of the area of fixed patterns 7 are designated A1A2 in the SONET standard and the transport supervision data 4 are designated B1-BIP8 in the SONET standard.

Figure 2:
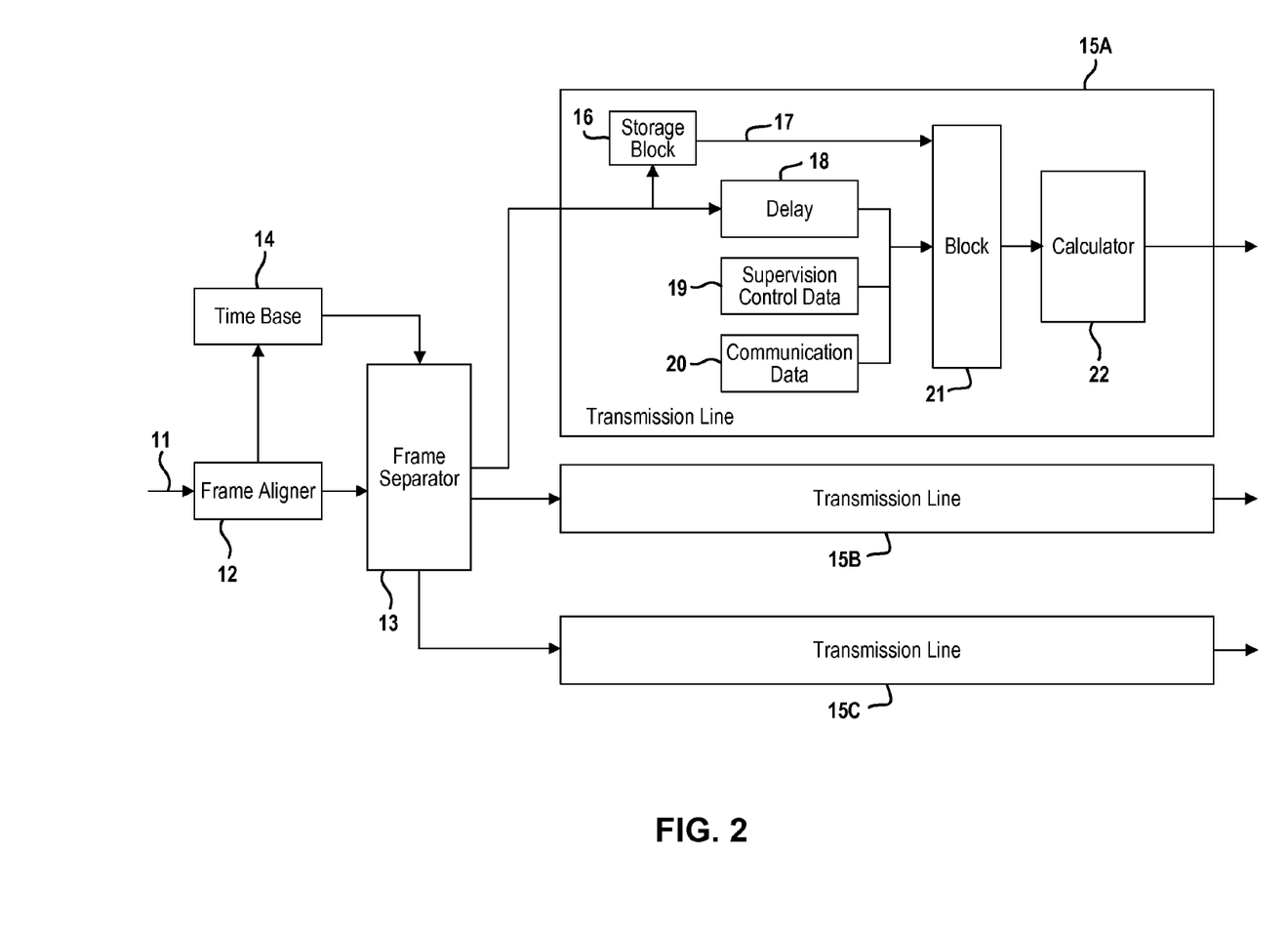
FIG. 2 and FIG. 3 show the diagram of an embodiment of the method according to the invention in the case of an inverse multiplexer.
Figure 3:
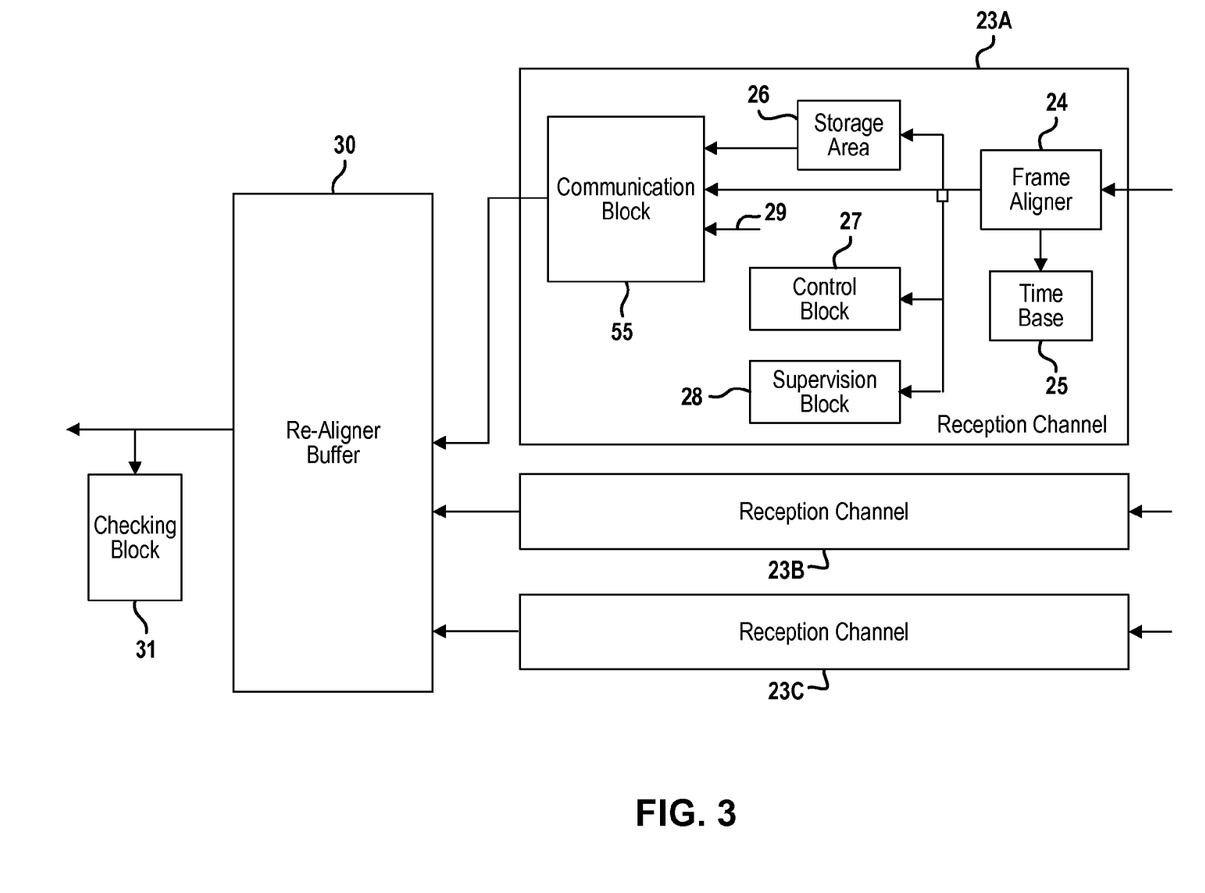

FIG. 2 and FIG. 3 illustrate an embodiment of the method which is the subject of the invention in the case of an inverse multiplexing link. FIG. 2 illustrates an embodiment of the method which is the subject of the invention in emission in the case of an inverse multiplexing link.

The method which is the subject of the invention is implemented at the level of an inverse multiplexing node of a tributary towards several channels. In the case of an inverse multiplexing according to the invention, the part in excess of the fixed patterns is replaced in emission by transport supervision data. In this case, the replacement data thus include supervision data of the frame proper.

A frame is received 11 at the level of the level of a frame aligner 12. The frame aligner 12 transmits to the frame separator 13, in a synchronized manner, through a time base 14. The separator 13 separates the frame on several transmission lines 15A, 15B, 15C.

The method implemented at the level of the transmission line 15A is described, but it should be understood that a similar method can be implemented at the level of each transmission line. The method can thus be implemented independently on each line, so as to allow an independent supervision on each line. At the level of line 15A, the initial transport supervision data 4 of the frame are stored at the level of a storage block 16. Such initial transport supervision data 4 are inserted 17 in the area of the fixed patterns 7 of the frame. Supervision control data 19 and communication data 20 are also inserted in this area of fixed patterns 7. Such data are data outside the frame. The supervision data are inserted at the level of the area of fixed patterns 7 thanks to an introduced delay 18. Such delay 18 aims at letting the frame scroll, so as to perform the insertion 17".

At the level of block 21, a frame including the initial supervision data 4 at the level of the area of fixed patterns 7 is thus created. For this frame, the new supervision data relating to the new frame are then calculated 22. Such new transport supervision data replace the transport supervision data 4 in the frame. This new frame is then transmitted to the transmission channel. The initial transport supervision data 4 being now included in the new frame at the level of the area of fixed patterns 7, the restitution of the totality of the frame data is then possible. This also provides for the equality in the frequency of the train of the original frames.

FIG. 3 illustrates an embodiment of the method which is the subject of the invention in reception in the case of an inverse multiplexing link. In reception, a frame arrives from a transmission line in reception channels 23A, 23B, 23C. The method implemented at the level of the reception line 23A is described, but it should be understood that a similar method can be implemented at the level of each reception line.

The frame arrives at the level of a frame aligner 24 connected to a time base 25. The initial transport supervision data 4 are retrieved from the area of fixed patterns 7 and are stored in a storage area 26. The control, supervision and communication data are also retrieved from respective blocks 27 and 28.

The original fixed patterns A1A2 are reintroduced 29 into the frame together with the initial transport supervision data 4. The transport supervision data 4 are then in the transport supervision data area 55. The frames of each reception are then re-aligned in a re-aligner buffer 30. Further to this re-alignment, the obtained tributary is identical to the original tributary. A checking block 31 can also be introduced further to the re-alignment in order to check the conformity of the thus obtained supervision data with the initial supervision data 4.

In the case of a frame of the SDH type, the fixed words are many, for example, 384 bytes for an STM transmission 64. Besides, it is possible to consider only four bytes of alignment words which suffice for obtaining a correct immunity against a high error rate. Then, 380 bytes remain to be operated in the area of fixed patterns. According to the invention, these bytes are then used for storing transport supervision data. In the case of an STM transmission 4, 92 bytes are available and the above described method can also be implemented.

While referring to FIGS. 4 and 5, a method according to the invention will now be described in the case of a multiplexing operation. In the case of the transparent multiplexing of several SDH trains, which is usually carried by the passage through a higher rate container, the fixed words in excess are destroyed in the SDH frames of the tributaries in order to clear rate with a view to creating a new frame, the rate of which is a strict multiple of the rate of the tributaries. Inserted data are more particularly transport supervision data as well as data related to the synchronization of tributaries on the same rhythm by the justification method.

Figure 4:
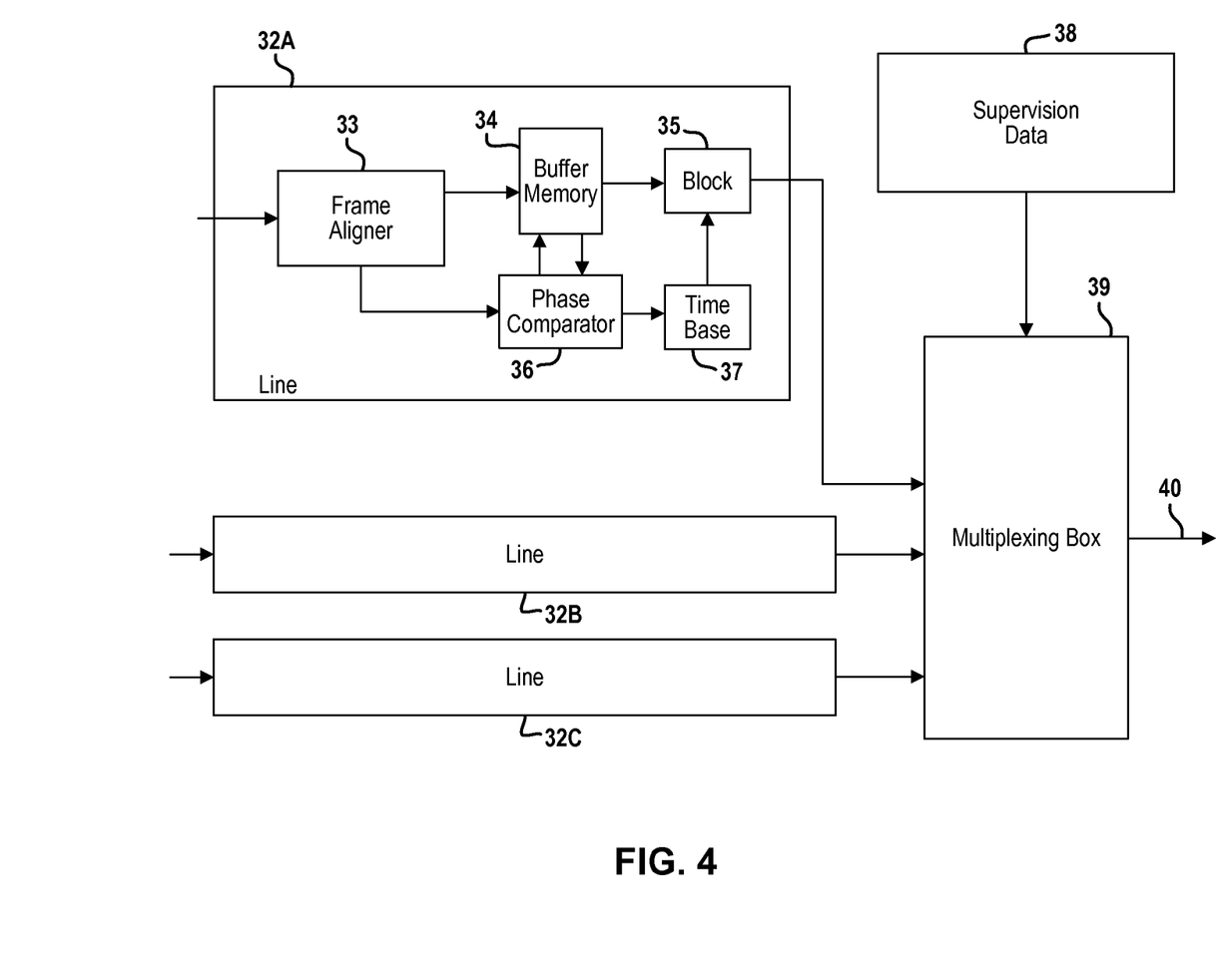
FIG. 4 and FIG. 5 show the diagram of one embodiment of the method according to the invention in the case of a multiplexer.

As illustrated in FIG. 4, an embodiment of the invention is not described in the case of a multiplexing link in emission. Frames arrive at the level of the lines 32A, 32B, 32C. The implementation of the method according to the invention is described at the level of the line 32A, but it should be understood that a similar method can be implemented at the level of the lines 32B and 32C. A frame aligner 33 makes it possible to delete fixed patterns from the area of fixed patterns 7 of the frame. The number of the deleted fixed patterns makes it possible to maintain a correct immunity with a high rate of error as previously described.

A buffer memory 34 makes it possible to store the lower rate train data resulting from this deletion. A memory reading device makes it possible to insert in the middle of the data read and in positions defined by the time base 37, data relating to the synchronization by implementing the justification method. This method uses memory filling and emptying indications provided by the phase comparator 36 between the memory reading and writing pointers. These indications affect the number of stuffing inserted by the time base 37 in order to regulate the centering of the memory.

The constitution of the new train is carried out using the rhythm of the multiplexing block 39 which results in making each of the flows coming out from the blocks 35 of the lines 32A, 32B and 32C synchronous and thus making them able to be multiplexed. Supervision data are added to the frame at the level of the area of fixed patterns. These supervision data replace 38, according to the invention, the previously deleted fixed patterns. The added data can also include communication channel data and control data. A frame relay 39 allows the multiplexing of the thus generated frames. The thus obtained tributary is transmitted 40 towards the transmission channel.

Figure 5:
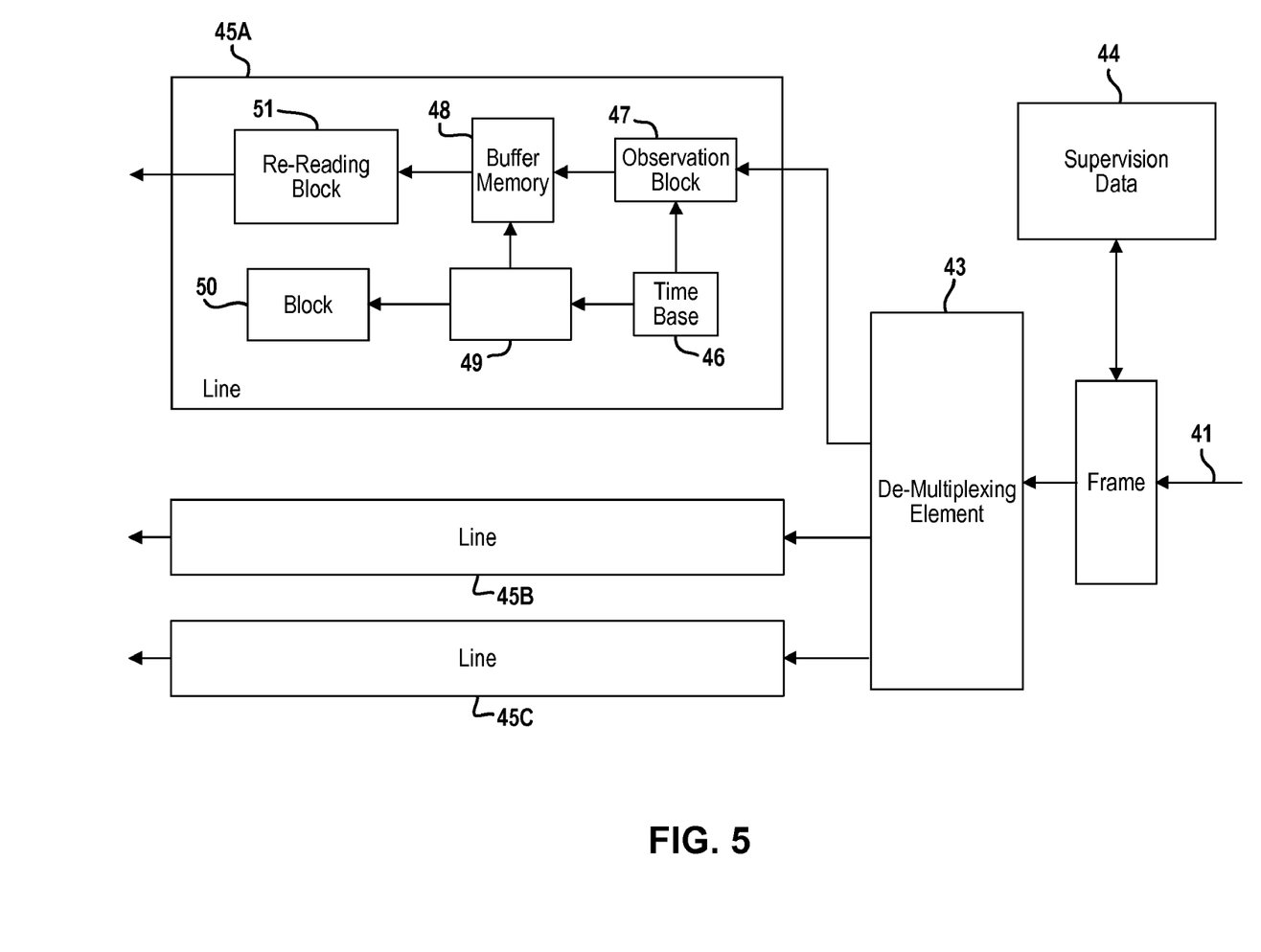

FIG. 5 illustrates an embodiment of the invention in the case of multiplexing in reception. In reception, the data added in emission are processed and they are then deleted and replaced by the original fixed pattern, so as to reconstitute the original train. Then, upon the reception 41 of a tributary, an alignment on the frame 42 is carried out. A de-multiplexing element 43 then de-multiplexes the frames towards several lines 45A, 45B, 45C. At this stage, the transport supervision data added are processed 44. Then they are deleted.

The contents of each multiplex container at the emission is observed by the block 47, so as to retrieve the data relating to the synchronization in order to restore a number of time base stuffings identical to those introduced in emission (de-justification method) as well as supervision data belonging to the tributary. The positions of these deletions are communicated to the de-mapper by the time base 46. The time base also allows the generation of writing blocking signals in the buffer memory 48 in order to restore a train having a lower rate than the one transmitted on line and the contents of which is identical to the original tributary minus the fixed patterns which had been deleted in emission.

The re-reading by block 51 of the contents of the memory and the re-inscription, in the data flow, at their initial places and in an identical number of the fixed patterns A1A2, returns the original contents to the train. Block 50 makes it possible to restore the rhythm using a phase lock loop using, as a reference clock, the writing clock 49 in the buffer memory. The thus restored train has thus contents and a rhythm equivalent to the original ones. The original fixed pattern A1A2 which have been previously deleted are then re-inserted in the frame so as to restore the original train.

And another aspect of the invention will be described more particularly in the case of the multiplexing or the regeneration as mentioned above. According to this aspect, the invention relates to a method for transmitting at least one tributary in synchronous mode at the level of a link of a data network, said tributary including at least one frame 1, said frame including at least one payload envelope area 3 and one transport overhead area 2, said payload envelope area 3 including at least a payload 5 and load supervision data related to the payload 6, said transport overhead area including at least transport overhead data 4 relating to transport and an area of fixed patterns zone including fixed patterns, said method including steps of:
modifying said frame in order to generate a modified frame;
transmitting said modified frame,
the modification include at least one step in which:
a part of said fixed patterns are deleted from said area of fixed patterns, so as to reduce the rate of the tributary.

According to this aspect of the invention, the fixed patterns are themselves used as information for adjusting the rate during the passage through a transmission device, more particularly for the multiplexing or the regeneration. As a matter of fact according to this aspect of the invention, the deletion of a part of the fixed patterns makes it possible to adapt the rate of the tributary to the transmission device during the multiplexing or the regeneration. According to this aspect of the invention, the fixed patterns are deleted without being replaced by other data, so that a reduction in the rate results. In this case, the simple deletion of the fixed pattern does not allow the compatibility with the SDH protocol. Then, the aggregation of N incident tributaries for example of the OC48 type will be obtained after the above mentioned modification through the deletion of some patterns, so as to obtain a non SDH format using an independent multiplexing device which is not complying with the SDH standard managing the adaptation of the rate for example through a justification.

According to this aspect of the invention, the deletion of some fixed patterns allows a reduction in the rate of the tributary. Then it is possible to adapt the rate of the N tributaries to that of the multiplexer through deletions or insertions of patterns A1A2. If their rate is more important than that of the multiplexer, a simple deletion of the patterns A1A2 allows a reduction in the rate and thus allows an adaptation to the rate of the multiplexer. On the contrary, if their rate is lower than that of the multiplexer, it is also possible to insert A1A2 patterns. In reception, the original train is restored by making is sure, prior to taking the tributary out of the system, that it has been restored with the appropriate number of patterns. Then, after the transport and the decapsulating of the trains OC48 deprived of some patterns A1A2, such patterns are re-inserted into the frame.

The invention claimed is:

1. A method for transmitting at least one tributary in synchronous mode at the level of a link of a data network, said tributary comprising at least one frame in the SDH or SONET format, said frame comprising at least one payload envelope area and one transport overhead area, said payload envelope area comprising at least one payload and load supervision data related to the payload, said transport overhead area comprising at least transport supervision data related to transport and an area of fixed pattern comprising fixed patterns, said method comprising:
modifying said frame so as to generate a modified frame;
transmitting said modified frame,
the modification comprising:
storing the transport supervision data of said frame of said tributary;
introducing a delay to said frame;
deleting part of said fixed patterns from said fixed pattern area;
recording the positions of said part of the fixed patterns deleted; and
inserting the stored transport supervision data at the level of said positions in said area of fixed patterns.

2. A method according to claim 1, further comprising:
after the step of storage, replacing said transport supervision data by new supervision data.

3. A method according to claim 1, wherein said data include external data.

4. A method according to claim 3, wherein said external data include data performing at least one function among the functions of error detection, remote control, communication and synchronisation channels.

5. A method according to claim 1, wherein said transmission includes an emission and a reception and wherein upon the reception, fixed words are re-inserted at the level of said positions.

6. A method according to claim 5, wherein upon the reception, said stored transport supervision data are re-introduced into the transport supervision data area.

7. A method according to claim 1, comprising introducing a delay, said stored transport supervision data being inserted after said introduced delay.

8. A device for the transmission of at least one tributary in synchronous mode at the level of a link of a data network, comprising:
said tributary comprising at least one frame in the SDH or SONET format, said frame comprising at least one payload envelope area and one transport overhead area, said payload area comprising at least one payload and load supervision data related to the payload, said transport overhead area comprising at least transport supervision data related to transport and an area of fixed patterns comprising fixed patterns;

said device comprising:
- a frame modifier operable to generate a modified frame;
- a transmitter operably transmitting said modified frame;
- a storage operably storing the transport supervision data;
- a deleter operably deleting part of said fixed patterns in said fixed pattern area;
- a recorder operably recording the positions of said part of the fixed patterns deleted; and
- an inserter operably inserting the transport supervision data at the level of said positions in said area of fixed patterns.

9. A method for transmitting at least one tributary in synchronous mode at a link of a data network, said method comprising:

(a) modifying a frame so as to create a modified frame, said frame including at least one payload envelope area and one transport overhead area, said payload envelope area including at least one payload and load supervision data related to said payload, said transport overhead area initially including at least transport supervision data related to transport and an area of fixed patterns;

said modifying further comprising:
(i) recording the initial transport supervision data;
(ii) introducing a delay to the frame;
(iii) removing part of said fixed patterns;
(iv) determining positions of said part of said removed fixed patterns;
(v) inserting the stored initial transport supervision data at said positions in said area of fixed patterns;
(vi) inserting new transport supervision data in the transport overhead area in place of the initial transport supervision data, said tributary including at least one frame in one of a SDH format and a SONET format; and (b) transmitting said modified frame.

10. The method of claim 9, wherein said data include external data.

11. The method of claim 10, wherein said external data include data performing at least one function among the functions of error detection, remote control, communication and synchronization channels.

12. The method of claim 9, wherein said transmission includes an emission and a reception and wherein upon the reception, fixed words are re-inserted at the level of said positions.

13. The method of claim 12, wherein upon the reception, said stored initial transport supervision data inserted at said positions are re-introduced into the transport supervision data area.

14. The method of claim 9, further comprising introducing a delay, said stored initial transport supervision data being inserted after said introduced delay.

* * * * *